US012239141B2

(12) United States Patent
Brocheret et al.

(10) Patent No.: US 12,239,141 B2
(45) Date of Patent: Mar. 4, 2025

(54) METHOD FOR PRODUCTION OF SOFT CHEESE COMPRISING SIMULTANEOUS ADDITION OF ACIDIFYING BACTERIA AND COAGULANT

(71) Applicant: Chr. Hansen A/S, Hoersholm (DK)

(72) Inventors: Sylvain Brocheret, Paris (FR); Marc Faiveley, Villenave d'Ornon (FR); Jean-Paul Poignand, Besancon (FR); Sebastien Roustel, Chateau-Chalon (FR)

(73) Assignee: Chr. Hansen A/S, Hoersholm (DK)

( * ) Notice: Subject to any disclaimer, the term of this patent is extended or adjusted under 35 U.S.C. 154(b) by 506 days.

(21) Appl. No.: 15/549,355

(22) PCT Filed: Feb. 10, 2016

(86) PCT No.: PCT/EP2016/052844
§ 371 (c)(1),
(2) Date: Aug. 7, 2017

(87) PCT Pub. No.: WO2016/128477
PCT Pub. Date: Aug. 18, 2016

(65) Prior Publication Data
US 2018/0035687 A1 Feb. 8, 2018

(30) Foreign Application Priority Data
Feb. 10, 2015 (EP) ..................................... 15154506

(51) Int. Cl.
*A23C 19/032* (2006.01)
*A23C 19/05* (2006.01)
*A23C 19/068* (2006.01)

(52) U.S. Cl.
CPC ............ *A23C 19/032* (2013.01); *A23C 19/05* (2013.01); *A23C 19/068* (2013.01)

(58) Field of Classification Search
USPC ........................................................ 426/430
See application file for complete search history.

(56) References Cited

U.S. PATENT DOCUMENTS 3,142,575 A    7/1964  Tynan et al.
3,787,330 A *  1/1974  Sugahara ................. B01J 20/12
                                                502/72

(Continued)

FOREIGN PATENT DOCUMENTS

EP    0 196 436 A1    10/1986
GB    2 092 426 A      8/1982

(Continued)

OTHER PUBLICATIONS

Shaw, The manufacture of soft, surface mould, ripened cheese in France with particular reference to Camembert Journal of the Society of Dairy Technology, vol. 34, No. 4, Oct. 1981 131 (Shaw).*

(Continued)

*Primary Examiner* — Donald R Spamer
*Assistant Examiner* — Philip A Dubois
(74) *Attorney, Agent, or Firm* — Foley & Lardner LLP

(57) ABSTRACT

The invention relates to a method for treatment of milk which is to be used in the preparation of soft cheese, the method comprises adding, practically simultaneously a slow acidifying bacterial culture, a fast acidifying bacterial culture and at least one coagulant. Preferred is a soft-cheese type, such as e.g. a brie type or a camembert type cheese.

22 Claims, 2 Drawing Sheets

(56) References Cited

U.S. PATENT DOCUMENTS

Figure 1:
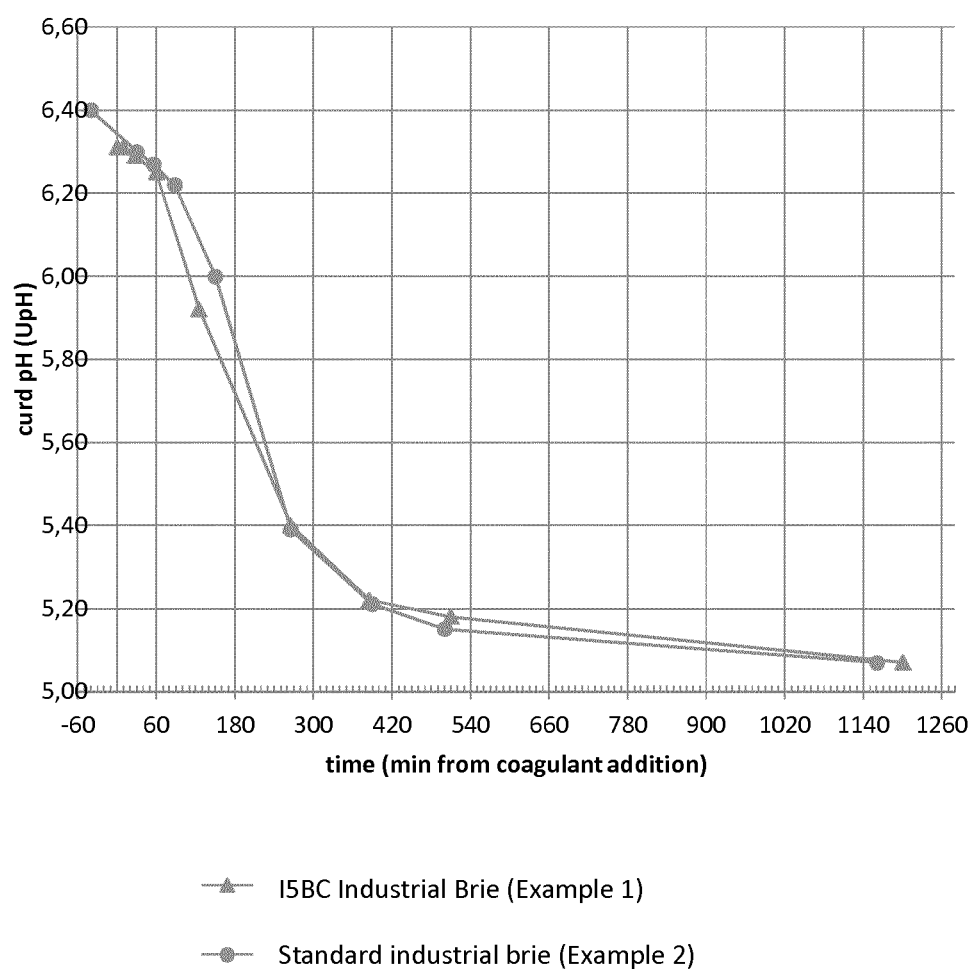

| | | | |
|---|---|---|---|
| 4,115,199 A * | 9/1978 | Porubcan | A23C 19/0323 435/252.4 |
| 4,415,594 A * | 11/1983 | Czulak | A23C 19/05 426/36 |
| 4,732,769 A | 3/1988 | Sozzi et al. | |
| 4,919,944 A | 4/1990 | Bussiere et al. | |
| 4,959,229 A * | 9/1990 | Reddy | A23C 19/051 426/39 |
| 5,702,738 A * | 12/1997 | Phillips | A23C 19/0682 426/34 |
| 8,007,844 B2 * | 8/2011 | Kleinmann | A23C 19/105 426/36 |
| 8,198,065 B2 | 6/2012 | Druesne et al. | |
| 2004/0146605 A1 * | 7/2004 | Weibel | A23C 19/054 426/36 |
| 2011/0008492 A1 * | 1/2011 | Broe | A23C 19/072 426/36 |
| 2012/0288586 A1 * | 11/2012 | Peterson | A23C 19/072 426/39 |
| 2013/0015345 A1 * | 1/2013 | Vertes | H01J 49/0404 250/282 |
| 2014/0141121 A1 * | 5/2014 | Van Den Tempel | A23C 19/0323 426/40 |

FOREIGN PATENT DOCUMENTS

| | | |
|---|---|---|
| WO | WO 2008/098973 A1 | 8/2008 |
| WO | WO 2010/022790 A1 | 3/2010 |
| WO | WO 2013/093049 A2 | 6/2013 |
| WO | WO 2015/067808 A1 | 5/2015 |

OTHER PUBLICATIONS

The Role of Fungi in Cheese Ripening, Economic Botany 7, 27-42, 1953 (Babel).*

Goudédranche, et al., "Procédés de transformation fromagère partie 2," F6306-1-F6306-24 (Sep. 2011).

Leclercq-Perlat, et al., "Camembert cheese: processing and ripening," in Handbook of Cheese in Health (Wageningen Academic Publishers) ISBN 978-90-8686, pp. 299-313 (2013).

Mietton, et al., "Minéreux et transformations fromagères", Chapter 16 in "Minereaux et produits laitieres" (Gaucheron, F., ed.) (Lavoiser) ISBN 2-7430-0641, pp. 472-563 (2004).

Lane et al., "Effect of Prematuration Conditions on the Proteolytic and Rheological Properties of Cheesemilk," Lait, vol. 81, pp. 415-417 (2001).

Anonymous; "Milk products - Determination of the acidification activity of dairy cultures by continuous pH measurement (CpH)"; ISO 26323, IDF 213; First Edition; Jul. 1, 2009; 20 pages.

Damin, M.R. et al.; "Chemical and viability changes during fermentation and cold storage of fermented milk manufactured using yogurt and probiotic bacteria"; IUFOST World Congress; 13th World Congress of Food Science & Technology; Jan. 2006; pp. 1271-1281.

Dandoy, Damien et al.; "The fast milk acidifying phenotype of *Streptococcus thermophilus* can be acquired by natural transformation of the genomic island encoding the cell-envelope proteinase PrtS"; Microbial Cell Factories, vol. 10 (Suppl 1); Aug. 30, 2011; 9 pages.

Fonseca, Fernanda et al.; "Method of quantifying the loss of acidification activity of lactic acid starters during freezing and frozen storage"; Journal of Dairy Research, vol. 67, No. 1; Feb. 2000; pp. 83-90.

Zanatta, P. et al.; "A new approach to the characterization of *Streptococcus salivarius* subsp *thermophilus* based on acidification rates"; Lait, vol. 72, No. 3; Feb. 1992; pp. 285-295.

* cited by examiner pH curves of standard Camembert type making vs I5BC camembert making

METHOD FOR PRODUCTION OF SOFT CHEESE COMPRISING SIMULTANEOUS ADDITION OF ACIDIFYING BACTERIA AND COAGULANT

CROSS-REFERENCE TO RELATED APPLICATIONS

The present application is the U.S. National Stage of International Application PCT/EP2016/052844, filed Feb. 10, 2016, and claims priority to European Patent Application No. 15154506.8, filed Feb. 10, 2015.

FIELD OF INVENTION

The invention relates to a method for improving the process of making soft cheese. It further relates to the use of specific microbiological strains and coagulants to facilitate soft cheese production without the need for preceding warm maturation.

BACKGROUND OF INVENTION

Raw milk received for cheese production, especially in an industrial cheese plant, has to be stored until it can be used for cheese production, mainly due to bottlenecks in the cheese plant. During the storage, wherein the milk is kept cold, the mineral balance of the milk is displaced, minerals are lost, and it therefore loses some of its original ability to coagulate and undergo syneresis, two very important properties in cheese making (Lane, C. N., Sousa, M. J., and McSweeney, P. L. H. (2001)).

In order to restore these properties to the milk, especially milk to be used for soft cheese such as camembert, the milk normally undergoes a processing, a so-called "cold-maturation" step, where the purpose is to prepare the milk for cheese making.

Cold maturation consists of physical and biological maturation that aims at obtaining five objectives, generally believed to make the milk more suitable for cheese making (Pernoud S. and Mayer H. L. (2008)):

1. Physical maturation: Re-equilibrate the mineral balance of the milk to restore the milk's ability to coagulate and undergo syneresis (e.g. by adding CaCl2 and storing the milk at temperatures between 10 and 15° C.).
2. Biological maturation: Lower the pH of the milk from about pH 6.7 to a level suitable for renneting (normally in the range of pH 6.2-6.4 for e.g. Camembert). Normally, lactic acid bacteria cultures that acidify milk well are used to obtain biological maturation
3. Reduce the red-ox potential to favor the growth of strains inhibited by oxygen.
4. Produce small peptides and amino acids in surplus to support growth of lactic acid bacteria from proteolytic degradation of casein.
5. Release bacterial enzymes to enhance the ripening of the cheese.

In cold maturation the milk normally undergoes a mild heat treatment (thermization, e.g. 62° C. for 20 seconds) or pasteurization (e.g. 72° C. for 15 seconds) to remove psychrotroph bacteria such as *Listeria* species. CaCl2 may be added and the milk is kept at 10-15° C. for 14 to 18 hrs. to restore the calcium balance of the milk (physical maturation).

Following physical and biological maturation, the milk is normally pasteurized (e.g., 72° C. for 20 seconds) to kill and lyse the culture used for the biological maturation thereby releasing bacterial enzymes that may assist in ripening.

Subsequent to the cold maturation the milk may undergo pasteurization and warm maturation.

During the warm maturation, the milk is most often inoculated with lactic acid bacteria and kept at coagulation temperature for 20-90 mins.

In soft cheese production, this warm maturation step is never less than 30 minutes and can go up to 90 minutes. In Literature, we can find description of different soft cheese processes where a warm maturation is systematically mentioned. However the duration is not always given. [Goudédranch; Camier-Caudron, Gassi, Schuck. (2011), M. N. Leclercq-Perlat (2013).

As with the cold maturation, the purpose of the warm maturation comprise a number of objectives generally believed to make the milk more suitable for cheese making, including Biological maturation: Lower the pH of the milk from about pH 6.7 to a level suitable for renneting (normally in the range of pH 6.2-6.4 for e.g. Camembert). Normally, lactic acid bacteria cultures that acidify milk well are used to obtain biological maturation and reducing the red-ox potential to favor the growth of strains inhibited by oxygen.

However the warm maturation has significant drawbacks including, but not limited to:

1) Investments in production equipment: Building and maintaining holding tanks is a significant investment for dairy owners.
2) Energy consumption: In particular during winter, keeping the holding tanks at 40° C. entails significant energy consumption.
3) Bacteriophage exposure: Keeping the inoculated milk at 40° C. for an extended period of time creates a significant exposure to contamination by phages, which is a significant threat in cheese and yogurt production.
4) Variation and Processability: performing the warm maturation as a batch process to feed a continuous cheese production process impose a risk since in the case of mechanical breakdown in the continuous production line, the inoculated batch will continue its fermentation and impose unwanted variations in the milk quality before subsequent coagulation and acidification.

Being able to bypass the warm maturation step is therefore highly desired as it would remove the investments and risks associated with that step in the cheese production process. Previous attempts to avoid warm maturation in the production of soft cheese have included the use of fast acidifying cultures combined with a physical inactivation by e.g. salt and/or cold. However, this approach is not applicable in the production of surface ripened cheeses such as e.g. brie or camembert type cheese due to the necessity to keep a temperature allowing surface ripening cultures to grow (around 12° C.) which allow also lactic cultures to continue to acidify and create excessive post-acidification.

SUMMARY OF INVENTION

Present invention allows bypassing warm maturation in the production of soft cheese by providing a specific blend of bacterial strains directly inoculated in high concentration and working in concert with a specifically developed coagulant.

DRAWINGS

FIG. 1: pH curves of standard brie making and I5BC brie making without warm maturation from −40 min to 0 min. Green triangles: I5BC brie, Orange dots: standard brie making.

Figure 2:
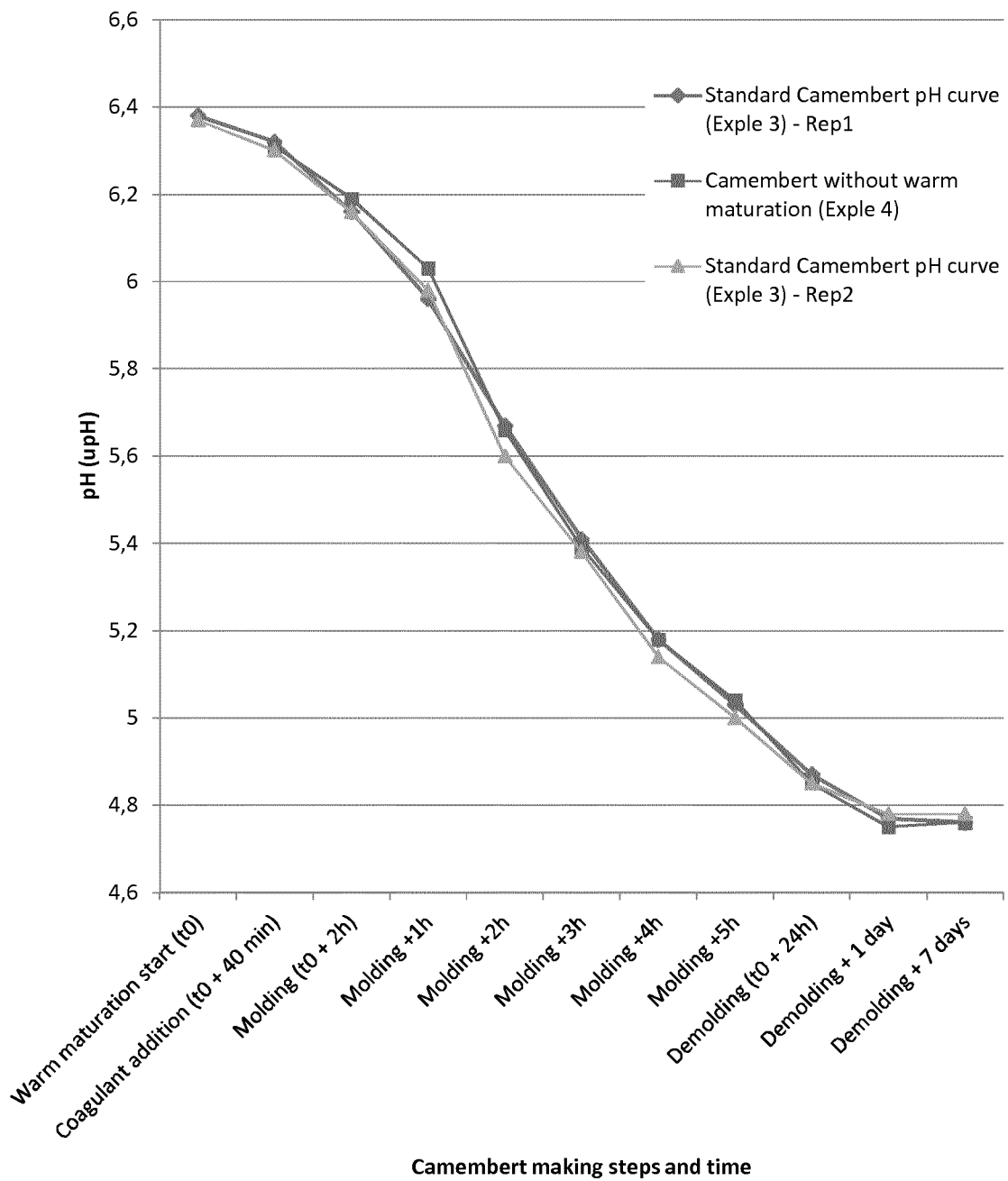

FIG. 2: Acidification curves of I5BC camembert and standard camembert make in duplicates. Blue diamonds and green triangles: standard camembert make (duplicate). Red squares: I5BC camembert without warm maturation.

DETAILED DISCLOSURE

In a first aspect, the present invention relates to a method of treatment of milk to be used for production of cheese, said method comprising:
a) adding to the milk a slow acidifying bacterial culture and adding to the milk a fast acidifying bacterial culture,
b) adding to the milk one or more coagulants and
c) incubating the milk,
wherein steps a) and b) are done simultaneously or practically simultaneously (such as e.g. within 15 mins, 10 mins, or 5 mins or 2 mins regardless of order).

The method may further comprise the following steps:
d) adjusting the pH (GDL/CO2/etc.) and/or
e) leaving the milk for coagulation to obtain a curd and a whey fraction and/or
f) cutting the curd and/or
g) draining the milk composition and and/or
h) molding and/or
i) further draining and/or
j) salting the coagulated milk composition and/or
k) coating the cheese with a microbial culture and/or
l) ripening the cheese.

The slow or fast acidifying bacterial culture may be a culture of lactic acid bacteria, such as a culture of one or more strains, selected from the group consisting of *Lactococcus* spp., *Streptococcus* spp(ST)., *Lactobacillus* spp., *Leuconostoc* spp., *Pseudoleuconostoc* spp., *Pediococcus* spp., *Brevibacterium* spp., *Enterococcus* spp. and *Propionibacterium* spp.

In a related aspect, the bacterial culture is a mesophilic slow culture which lowers the pH less than 0.25 pH units (such as less than 0.20 pH units, less than 0.15 pH units, or less than 0.10 pH units) per hour at 30 degrees C., when inoculated at a quantity of 10E6 cfu (colony forming units) per ml laboratory milk.

In yet a related aspect, the invention relates to a method, wherein the bacterial culture is a thermophilic slow culture lowers the pH less than 1.4 pH Unit within 4 h incubation in a Lab milk when inoculated at quantity of 10^6 cfu (colony forming units) per ml laboratory milk at 40° C.

In yet a related aspect, the invention relates to a method wherein the bacterial culture is a mesophilic fast culture which lowers the pH more than or equal to 0.25 pH units per hour at 30 degrees C., when inoculated at a quantity of 10E6 cfu (colony forming units) per ml laboratory milk In yet a related aspect, the invention relates to a method wherein the bacterial culture is a thermophilic fast culture which lowers the pH more than 1.4 pH Unit within 4 h incubation in a Lab milk when inoculated at quantity of 10^6 cfu (colony forming units) per ml laboratory milk at 40° C.

In yet a related aspect, the invention relates to a method wherein the bacterial culture is a culture of one or more strains selected from the group consisting of *Streptococcus* spp. or mutants or variants of any of these strains.

In yet a related aspect, the invention relates to a method wherein the one or more coagulants are one or more chymosins, such as e.g. a chymosin with a bovine or camel origin.

In yet a related aspect, the invention relates to a method wherein the one or more coagulants is a blend of two or more coagulants.

In yet a related aspect, the invention relates to a method wherein the one or more coagulants is a blend of two or more different chymosins, e.g. a bovine derived and a camel derived chymosin.

In yet a related aspect, the invention relates to a method wherein the one or more coagulants of the blend of coagulant exhibit a C/P ratio which is at least three times higher, such as e.g. 4, 5, 6, 7, or 8 times higher than the C/P ratio of bovine derived chymosin such as e.g. ChyMax®.

In yet a related aspect, the invention relates to a method wherein the coagulant is added from 0-20 mins, such as e.g. within 15 mins, 10 mins, 5 mins or 2 mins after step a).

In yet a related aspect, the invention relates to a method described above wherein the cheese is surface ripened.

In yet a related aspect, the invention relates to a method as described above wherein the cheese is a soft-cheese type, such as e.g. a brie type or a camembert type cheese.

In yet a related aspect, the invention relates to a method as described above wherein the fat on dry matter content in the cheese is from 25% to 35% such as e.g. around 30%.

In yet a related aspect, the invention relates to a method as described above wherein the salt level is from 0.5% to 2%, such as e.g. between 1.0 and 1.5%, such as e.g. 1.3% on dry matter content in the cheese is from 25% to 35% such as e.g. around 30%.

In yet a related aspect, the invention relates to a method as described above wherein the dry matter content is from 40% to 55%, such as e.g. 45% to 50% such as e.g. 48%.

In yet a related aspect, the invention relates to a method as described above wherein one or more of the bacterial cultures and/or the coagulant is added as a concentrated liquid solution.

In yet a related aspect, the invention relates to a method as described above wherein one or more of the bacterial cultures and/or the coagulant is added as a Direct Vat Set (DVS) formulation.

In yet a related aspect, the invention relates to a method as described above wherein the coagulant is added in a final concentration of 1000 to 10000 such as e.g. 3000 to 6000 such as e.g. 4000 IMCU's per 100 l milk.

In yet a related aspect, the invention relates to a method as described above wherein the pH drops at least 1.5 units within 3 hours after performing step a) and b).

In yet a related aspect, the invention relates to a method as described above wherein the milk prior to step a) is free or substantially free of microbial cultures.

In yet a related aspect, the invention relates to a method as described above wherein the milk has not been subject to warm maturation prior to step a).

In yet a related aspect, the invention relates to a method as described above wherein the milk is cow's milk.

Hence accordingly, the present invention also relates to a cheese obtainable by the method as described in any of the aspects above.

Additionally the invention relates to a milk, e.g. for use in the production of soft-cheese, which is obtainable by the method as described in any of the aspects above.

Hence in yet a related aspect, the present invention relates to a milk comprising a slow acidifying bacterial culture, a fast acidifying bacterial culture and optionally further comprising a camel chymosin and non-camel chymosin such as e.g. a bovine chymosin, a mucor chymosin or a variant thereof. Present invention further relates to a cheese prepared by the method according to any of the aspects herein, or by using the milk according to any of the aspects described above.

The method may comprise further cheese making steps. Such steps are known to the person skilled in the art.

In a last aspect, the invention relates to a cheese obtainable by the method of the invention, such as a soft cheese, e.g. camembert.

Definitions

In the present context, the term "milk" refers to the lacteal secretion obtained by milking any mammal, such as cows, sheep, goats, buffaloes or camels. In a preferred embodiment, the milk is cow's milk, and especially raw cow's milk. However, it should be understood that the term milk also comprises compositions comprising milk, and milk compositions that have been treated, e.g. chemically, enzymatically, and/or mechanically.

In the context of the present invention, "microorganism" may include any bacterium, or fungus being able to ferment the milk substrate. Lactic acid bacteria and in particular *Streptococcus thermophilus* ssp. and *Lactococcus* ssp. are preferred microorganisms.

The microorganisms used for most fermented milk products are selected from the group of bacteria generally referred to as lactic acid bacteria. As used herein, the term "lactic acid bacterium" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. Additionally, lactic acid producing bacteria belonging to the group of the strict anaerobic bacteria, bifidobacteria, i.e. *Bifidobacterium* spp., are generally included in the group of lactic acid bacteria. These are frequently used as food cultures alone or in combination with other lactic acid bacteria.

As used herein, the term "culture" refers to any sample or item that contains one or more microorganisms. "Pure cultures" are cultures in which the organisms present are only of one strain of a particular genus and species. This is in contrast to "mixed cultures," which are cultures in which more than one genus and/or species of microorganism are present. In some embodiments of the present invention, pure cultures find use, but normally a culture as used in present invention contains more than one strain.

In the context of the present invention, "laboratory milk" is a reconstituted skim milk (RSM) with 9.5% dry-matter on a weight basis that has been subjected to temperatures of 99° C. for 30 minutes before use.

In the context of the present invention, a "slow acidifying" bacterial culture (or a culture which acidifies the milk slowly) is either a mesophlic culture which has a maximum rate of acidification of 0.25 pH units per hour at 30 degrees C. when inoculated at a quantity of 10^6 cfu (10E6 colony forming units) per ml laboratory milk (For the sake of completeness, if the culture consists of more than one strain, the culture as a whole should have the max rate of acidification of 0.25 UpH per hour at 30 degrees C. as when inoculated 10^6 cfu/ml milk as defined above) or a thermophilic culture which is not able to decrease pH more than 1.4 pH unit in 4 h incubation in a Lab milk when inoculated at quantity of 10^6 CFU—this definition for thermophilic cultures is preferred to maximum rate of acidification due to better characterization of fast and slow culture in the context of this invention.

In the context of the present invention, any other culture than a slow acidifying culture may be defined as a "fast acidifying" bacterial culture.

In the context of present invention the culture of bacteria which are mesophilic slow culture, lowers the pH less than 0.25 pH units (such as less than 0.20 pH units, less than 0.15 pH units, or less than 0.10 pH units) per hour at 30 degrees C., when inoculated at a quantity of 10E6 cfu (colony forming units) per ml laboratory milk.

In the context of present invention the culture of bacteria which are thermophilic slow culture lowers the pH less than 1.4 pH Unit within 4 h incubation in a Lab milk when inoculated at quantity of 10^6 CFU In the context of present invention the culture of bacteria which are mesophilic fast culture, lowers the pH more than or equal to 0.25 pH units per hour at 30 degrees C., when inoculated at a quantity of 10E6 cfu (colony forming units) per ml laboratory milk.

In the context of present invention the culture of bacteria which are thermophilic fast culture lowers the pH more than 1.4 pH Unit within 4 h incubation in a Lab milk when inoculated at quantity of 10^6 CFU By the term "practically simultaneously" is understood within 0 to 20 mins before or after one or more actions, such as e.g. 0 to 15 mins before or after, such as e.g. 0 to 5 mins before or after.

By the term "warm maturation" is understood holding the milk at a temperature between 20° C. and 50° C., such as 25° C. to 45° C., such as e.g. 30° C. to 45° C., such as e.g. 40° C. in the presence of lactic bacteria and without the addition of coagulants for at least 20 minutes.

"Soft cheese" is defined as any Rennet coagulated cheese that contains about 70-74% moisture on a non-fat solids basis and is produced without scalding and pressing. Hence the preferred examples of Soft Cheese encompass brie, camembert, roquefort, etc.

In the present context, the term "mutant" should be understood as a strain derived, or a strain which can be derived, from a strain of the invention (or the mother strain) by means of e.g. genetic engineering, radiation and/or chemical treatment. It is preferred that the mutant is a functionally equivalent mutant, e.g. a mutant that has substantially the same, or improved, properties (e.g. regarding acidification speed) as the mother strain. Such a mutant is a part of the present invention. Especially, the term "mutant" refers to a strain obtained by subjecting a strain of the invention to any conventionally used mutagenization treatment including treatment with a chemical mutagen such as ethane methane sulphonate (EMS) or N-methyl-N'-nitro-N-nitroguanidine (NTG), UV light, or to a spontaneously occurring mutant. A mutant may have been subjected to several mutagenization treatments (a single treatment should be understood one mutagenization step followed by a screening/selection step), but it is presently preferred that no more than 20, or no more than 10, or no more than 5, treatments (or screening/selection steps) are carried out. In a presently preferred mutant, less than 5%, or less than 1% or even less than 0.1% of the nucleotides in the bacterial genome have been shifted with another nucleotide, or deleted, compared to the mother strain.

In the present context, the term "variant" should be understood as a strain or enzymes which is functionally equivalent or superior to a strain or enzyme of the invention, e.g. having substantially the same, or improved, properties e.g. regarding acidification speed or coagulation specificity). Such variants, which may be identified using appropriate screening techniques, are a part of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

EXAMPLES

Example 1

Standard Industrial Brie (60% Fat) Type Soft Cheese

The milk used is prepared from milk powders without added whey proteins.

Milk is standardized to 36 g/L of Proteins and 60 g/L of fat. pH is about 6.60-6.70.

50 ml of 470 g/L-CaCl2 /100 L of milk is then added.
Milk is cooled at 12° C.
Milk is kept 17 h for physical maturation at 12° C.
Milk is then pasteurized at 72° C./20 s.
Milk temperature is set at 39° C.
10 ml of 470 g/L-CaCl2 is added
Ripening culture blend PCA1 (3 U/1000 L)+Geo CB (1 U/1000 L) is added to the milk
4 g of Secondary culture F-DVS SSC100 per 100 L is added to the milk.
Milk is incubated 60 minutes for Warm maturation, pH at the end of warm maturation is 6.4 and temperature 38.5° C.

Coagulant addition is then performed: Hannilase is used with a dosage of 4000 IMCU/100 L of milk. Clotting time is 8 min. Curd is kept for hardening time during 17 min. Total coagulation time is therefore 25 min.

The curd is then cut into cubes of 15×15×15 mm.

Three stirrings are made: one 20 min after cutting (2 movements) and one 15 minutes later (3 movements) and one 15 min later (3 movements).

One hour and 20 min after coagulant addition, the curd is transferred to 25 cm diameter round molds.

The curd is then drained in molds for 22 additional hours. The cheeses will be turned after 1 h and after 3 h and after 5 h. Temperature will decrease during drainage to reach 30° C. after 12 h and 18° C. at the end of drainage.

The cheeses are then removed from the forms. pH is 5.00 and temperature is 18° C. Dry matter of the cheese at this step is 48% and Fat on Dry Matter is 30%.

The cheeses are then salted in brine (1160 g/L density, pH5.0 and temperature 12° C.) for 60 min.

The cheeses will then be dried during 20 h at 17° C. and 88% relative humidity (RH) atmosphere.

Then the cheese will be ripened at 15° C. for 4 days with 96% RH and turned at D+5.

Then ripening temperature will decrease from 15 to 9° C. in 3 days.

The cheeses will then be packed into composite paper (OPP) at D+9. pH at packaging is 5.05, salt level 1.3%, fat level 30%, dry Mater 47%.

Tasting session is performed after 25 days.

Example 2

I5BC Industrial Brie (60% Fat) Type Soft Cheese

The milk used is prepared from milk powders without added whey proteins.

Milk is standardized to 36 g/L of Proteins and 60 g/L of fat. pH is about 6.60-6.70.

50 ml of 470 g/L-CaCl2 /100 L of milk is then added.
Milk is cooled at 12° C.
Milk is kept 17 h for physical maturation at 12° C.
Milk is then pasteurized at 72° C./30 s.
Milk temperature is set at 39° C.
10 ml of 470 g/L-CaCl2 is added
pH is adjusted to 6.4 with GDL
Ripening culture blend PCA1 (3 U/1000 L)+Geo CB (1 U/1000 L) is added to the milk
4.5 g of Secondary culture F-DVS SSC100 (slow ST) per 100 L is added to the milk.
0.5 g of secondary culture F-DVS STI06 (fast ST) per 100 L is added to the milk Coagulant addition is then performed: ChyMax® M is used with a dosage of 4000 IMCU/100 L of milk. Clotting time is 10 min. curd is kept for hardening time during 25 min. Total coagulation time is therefore 35 min.

The curd is then cut into cubes of 15×15×15 mm.

Two stirrings are made: one 30 min after coagulant addition (2 movements) and one 15 minutes later (3 movements).

One hour after coagulant addition, the curd is transferred to 25 cm diameter round molds.

The curd is then drained in molds for 22 additional hours. The cheeses will be turned after 1 h and after 3 h. Temperature will decrease during drainage to reach 30° C. after 12 h and 18° C. at the end of drainage.

The cheeses are then removed from the forms. pH is 5.00 and temperature is 18° C. Dry matter of the cheese at this step is 48% and Fat on Dry Matter is 30%.

The cheeses are then salted in brine (1160 g/L density, pH5.2 and temperature 12° C.) for 60 min.

The cheeses will then be dried during 20 h at 17° C. and 88% relative humidity (RH) atmosphere.

Then the cheese will be ripened at 15° C. for 4 days with 96% RH and turned at D+5.

Then ripening temperature will decrease from 15° C. to 9° C. in 3 days.

The cheeses will then be packed into composite paper at D+9. pH at packaging is 5.05, salt level 1.3%, fat level 30%, dry matter 48%.

Tasting session is performed after 25 days.

Comparative results between standard Brie type process (with warm maturation) and I5BC process (without warm maturation)

pH curves: pH curves are substantially similar, see FIG. 1

Tasting session: both cheeses were within taste target.
Texture was similar between the two productions types.

Example 3

Standard Industrial Camembert Type Soft Cheese

The milk used is prepared from milk powders without added whey proteins.

Milk is standardized to 39 g/L of Proteins and 40 g/L of fat.

pH is about 6.60-6.70.

16 ml of 470 g/L-CaCl2 /100 L of milk is then added.

Milk is cooled at 12° C.

Milk is kept 17 h for physical maturation at 12° C.

Milk is then pasteurized at 72° C./30 s.

Milk temperature is set at 35° C.

Milk pH is adjusted with GDL to 6.30

Ripening culture blend PCA1 (4 U/1000 L)+Geo CB (1 U/1000 L)+LAF-7 (4 U/1000 L) is added to the milk 10 g of Secondary culture F-DVS Flora tradi-01 per 100 L is added to the milk.

2 g of Aroma forming culture F-DVS SDMB7/100 L is added to the milk.

Milk is incubated 40 minutes for Warm maturation. pH at the end of warm maturation is 6.2 and temperature 33.5° C.

Coagulant addition is then performed: Naturen® is used with a dosage of 3500 IMCU/100 L of milk. Clotting time is 5 min. curd is kept for hardening time during 40 min. Total coagulation 40 time is therefore 45 min.

The curd is then cut into cubes of 15×15×15 mm.

One stirring is made 10 min after cutting (2 movements)

One hour and 20 min after coagulant addition, the curd is transferred to 12 cm diameter round molds.

The curd is then drained in molds for 22 additional hours. The cheeses will be turned after 1 h and after 3 h and after 5 h. Temperature will decrease during drainage to reach 30° C. after 4 h and 18° C. at the end of drainage.

The cheeses are then removed from the forms. pH is 4.90 and temperature is 18° C. Dry matter of the cheese at this step is 45%, Fat on Dry Matter is 52%, NFHumidity is 72% Ca/NFS is 2%.

The cheeses are then salted in brine (1100 g/L density, pH4.7 and temperature 12° C.) for 60 min.

The cheeses will then be dried during 24 h at 16° C. and 95% relative Humidity atmosphere.

Then the cheese will be ripened at 13° C. for 7 days with 98% RH.

Example 4

I5BC Industrial Camembert Type Soft Cheese

The milk used is prepared from milk powders without added whey proteins.

Milk is standardized to 39 g/L of Proteins and 40 g/L of fat.

pH is about 6.60-6.70.

16 ml of 470 g/L-CaCl2 /100 L of milk is then added.

Milk is cooled at 12° C.

Milk is kept 17 h for physical maturation at 12° C.

Milk is then pasteurized at 72° C./30 s.

Milk temperature is set at 35° C.

Milk pH is adjusted with GDL to 6.30

Ripening culture blend PCA1 (4 U/1000 L)+Geo CB (1 U/1000 L)+LAF-7 (4 U/1000 L) is added to the milk 20 g of Secondary culture F-DVS Flora Tradi-01/100 L is added to the milk.

1 g of Secondary culture F-DVS STI06/100 L is added to the milk.

0.5 g of Secondary culture F-DVS SSC100/100 L is added to the milk.

2 g of Aroma forming culture F-DVS SDMB7/100 L is added to the milk

Coagulant addition is then performed: ChyMax M® is used with a dosage of 5000 IMCU/100 L of milk. Clotting time is 5 min. curd is kept for hardening time during 40 min. Total coagulation time is therefore 45 min.

The curd is then cut into cubes of 15×15×15 mm.

One steering is made 10 min after cutting (2 movements)

One hour and 20 min after coagulant addition, the curd is transferred to 12 cm diameter round molds.

The curd is then drained in molds for 22 additional hours. The cheeses will be turned after 1 h and after 3 h and after 5 h. Temperature will decrease during drainage to reach 30° C. after 4 h and 18° C. at the end of drainage.

The cheeses are then removed from the forms after 24 hours. pH is 4.90 and temperature is 18° C. Dry matter of the cheese at this step is 45%, Fat on Dry Matter is 52%, NFHumidity is 72% Ca/NFS is 2%.

The cheeses are then salted in brine (1100 g/L density, pH4.7 and temperature 12° C.) for 60 min.

The cheeses will then be dried during 24 h at 16° C. and 95% relative Humidity atmosphere.

Then the cheese will be ripened at 13° C. for 7 days with 98% RH.

Comparative results between standard Brie type process (with warm maturation) and I5BC process (without warm maturation)

pH curves: pH curves are substantially similar see FIG. 2

REFERENCES

Lane, C. N., Sousa, M. J., and McSweeney, P. L. H. (2001) "Effect of prematuration conditions on the proteolytic and rheological properties of cheesemilk", Lait 81, pp 415-427

Mietton, B., Gaucheron, F. and Salaün-Michel, F. (2004) "Minéreux et transformations fromàgeres", Chapter 16 in "Minereaux et produits laitieres" ed. Gaucheron, F., Lavoiser ISBN 2-7430-0641

Goudédranch; Camier-Caudron, Gassi, Schuck. "Procédés de transformation fromagère" (partie 2) "techniques de l'ingénieur", volume F4 après l'actualisation no F49 (septembre 2011)

M. N. Leclercq-Perlat, D. Picque, G. Corrieu (2013), << Camembert cheese: processing and ripening >> Handbook of cheese in health pp299-213—Wageningen Academic Publisher ISBN 978-90-8686

All references cited in this patent document are hereby incorporated herein in their entirety by reference.

The invention claimed is:

1. A method for production of cheese of a soft-cheese type, comprising:
(a) adding to milk a slow acidifying bacterial culture and a fast acidifying bacterial culture, wherein
the slow acidifying bacterial culture is one or more selected from (i) a mesophilic slow culture which lowers the pH of laboratory milk by less than 0.25 per hour at 30° C., when inoculated at a quantity of $10^6$ colony forming units (CFU) per ml laboratory milk; and (ii) a thermophilic slow culture which lowers the pH of laboratory milk by less than 1.4 within 4 hours incubation at 40° C., when inoculated at a quantity of $10^6$ CFU per ml laboratory milk, and
the fast acidifying bacterial culture is one or more selected from (i) a mesophilic fast culture which lowers the pH of laboratory milk by greater than or equal to 0.25 per hour at 30° C., when inoculated at a quantity of $10^6$ CFU per ml laboratory milk; and (ii) a thermophilic fast culture which lowers the pH of laboratory milk by more than 1.4 within 4 hours incubation at 40° C., when inoculated at a quantity of $10^6$ CFU per ml laboratory milk, (b) adding to the milk one or more coagulants and (c) incubating the milk, wherein steps (a) and (b) are done simultaneously or within about 15 minutes of each other, regardless of order, and producing a cheese of a soft-cheese type with the milk, wherein the cheese contains about 70-74% moisture on a non-fat solids basis and has a dry matter content of from 40% to 55%, and is produced without scalding and without pressing, and without warm maturation.

2. The method of claim 1, wherein said step of producing a cheese of a soft-cheese type with the milk comprises one or more step selected from:

(d) adjusting the pH of the milk;

(e) permitting the milk to coagulate to obtain a curd and a whey fraction;

(f) cutting a curd fraction formed from the milk;

(g) draining a composition formed from the milk;

(h) molding a composition formed from the milk;

(i) further draining a composition formed from the milk;

(j) salting a coagulated composition formed from the milk;

(k) coating a cheese formed from the milk with a microbial culture; and (l) ripening a cheese formed from the milk.

3. The method of claim 1, wherein one or both of the slow acidifying bacterial culture and the fast acidifying bacterial culture comprises a culture of lactic acid bacteria.

4. The method of claim 1, wherein one or both of the slow acidifying bacterial culture and the fast acidifying bacterial culture comprises a culture of one or more strains selected from *Streptococcus* spp. and mutants or variants thereof.

5. The method of claim 1, wherein the one or more coagulants includes one or more chymosins.

6. The method of claim 1, wherein the one or more coagulants is a blend of two or more coagulants.

7. The method of claim 1, wherein the one or more coagulants includes a blend of a bovine derived chymosin and a camel derived chymosin.

8. The method of claim 1, wherein the one or more coagulants exhibit a clotting activity to proteolytical activity (C/P) ratio which is at least three times higher than the C/P ratio of bovine derived chymosins.

9. The method of claim 1, wherein the one or more coagulants is added within 15 minutes after step (a).

10. The method of claim 1, wherein the cheese is a surface ripened cheese.

11. The method of claim 1, wherein the fat content in the cheese is from 25% to 35% on a dry matter basis.

12. The method of claim 1, wherein the salt level in the cheese is from 0.5% to 2% and the fat content in the cheese is from 25% to 35% on a dry matter basis.

13. The method of claim 1, wherein the dry matter content of the cheese is from 40% to 50%.

14. The method of claim 1, wherein one or more of (i) one or more of the bacterial cultures and (ii) one or more of the coagulants is added as a concentrated liquid solution.

15. The method of claim 1, wherein one or more of (i) one or more of the bacterial cultures and (ii) one or more of the coagulants is added as a Direct Vat Set (DVS) formulation.

16. The method of claim 1, wherein the one or more coagulants is added to a final concentration of 1000 to 10000 IMCU per 100 liters milk.

17. The method of claim 1, wherein the pH of the milk drops by at least 1.5 within 3 hours after performing step (a) and step (b).

18. The method of claim 1, wherein the milk prior to step (a) is free or substantially free of microbial cultures.

19. The method according to claim 1, wherein the milk is cow's milk.

20. The method of claim 1, wherein the cheese is a Brie cheese.

21. The method of claim 1, wherein the cheese is a Camembert cheese.

22. The method of claim 1, wherein the cheese is a Roquefort cheese.

* * * * *